US005292144A

United States Patent [19]

Sosnoff

[11] Patent Number: 5,292,144

[45] Date of Patent: Mar. 8, 1994

[54] WHEELCHAIR TILTING SEAT CONVERSION KIT

[75] Inventor: Fred Sosnoff, Paxton, Mass.

[73] Assignee: Biomedical Horizons, Inc., Jackson, Mich.

[21] Appl. No.: 972,309

[22] Filed: Nov. 5, 1992

[51] Int. Cl.[5] .................... B62M 1/14

[52] U.S. Cl. .................... 280/304.1; 280/657; 297/322; 297/325

[58] Field of Search .................... 280/250.1, 304.1, 42, 280/647, 648, 657, 658, 47.38, 47.4, 47.41; 180/907; 297/317, 322, 325, 329, 330, 344, 346, DIG. 4

[56] References Cited

U.S. PATENT DOCUMENTS 4,085,946 4/1978 Krupp .................... 280/289
4,565,385 1/1986 Morford .................... 280/289
4,968,051 11/1990 Luo .................... 280/304.1
5,044,647 9/1991 Patterson .................... 280/250.1

*Primary Examiner*—Richard M. Camby
*Attorney, Agent, or Firm*—Beaman & Beaman

[57] ABSTRACT

A conversion kit for standard wheelchairs whereby a wheelchair with a stationary fixed seat can be retrofitted with a tiltable seat having a reclinable back. The seat and back may be separately infinitely variably adjusted by extendible lockable adjusters and the seat and back apparatus is readily mountable upon conventional wheelchair constructions.

11 Claims, 3 Drawing Sheets

WHEELCHAIR TILTING SEAT CONVERSION KIT

BACKGROUND OF THE INVENTION

1. Field of the Invention

The invention pertains to conversion kits for modifying standard wheelchairs having fixed seats to permit seat tilting and seat back reclining between infinitely variable positions.

2. Description of the Related Art

Many seriously handicapped patients spend the majority of their waking hours in wheelchairs. Conventional wheelchairs utilize fixed seats, and while some wheelchairs having fixed seats permit limited reclining of the seat backs, the spending of long hours in a relatively non-adjustable wheelchair produces body sores, muscle aches and spasms, and is generally uncomfortable for the patient due to the inability of the pressure points on the patient's body to be periodically varied by the shifting of the patient's weight as would occur if the seat position was adjustable.

Wheelchairs having tiltable seats and reclinable backs are available. However, such adjustable wheelchairs are very expensive and are not economically available to many patients who would benefit from such devices.

Efforts have been made to provide economically feasible wheelchair constructions having adjustable seat functions. For instance, U.S. Pat. No. 4,968,051 discloses a wheelchair having a reclinable seat back. U.S. Pat. No. 4,085,946 discloses a wheelchair which can be converted to a dental chair, and U.S. Pat. No. 4,565,385 discloses a conventional wheelchair used in conjunction with support apparatus which permits the wheelchair to be tilted to add to the patient comfort.

U.S. Pat. No. 5,044,647 discloses a wheelchair modification kit which may be retrofitted to existing wheelchairs to permit the seat to be pivoted, and limited angular adjustment between the seat and seat back is also possible. This patent deals with the same problem addressed by the instant invention, but the apparatus shown in U.S. Pat. No. 5,044,647 is expensive to manufacture and assemble to an existing wheelchair, and is not considered to meet the strength and rigidity requirements necessary.

OBJECTS OF THE INVENTION

It is an object of the invention to provide a wheelchair conversion kit which permits a standard wheelchair to be converted to a wheelchair having a tiltable seat and a reclinable seat back, the kit being readily retrofitted to existing conventional wheelchair constructions.

Another object of the invention is to provide a retroffittable wheelchair conversion kit which permits a tiltable seat and a reclinable seat back to be mounted upon a conventional wheelchair frame and wherein the seat and seat back may be separately adjustable, and each may be releasably locked in the desired angular position.

A further object of the invention is to provide a conversion kit for standard wheelchairs which permits a tilting seat and reclinable seat back to be assembled to a conventional wheelchair and wherein the components are economical to manufacture, the assembly of the kit to a wheelchair may be readily accomplished by mechanics of ordinary skill with conventional tools, and the resultant modified wheelchair is of a strong and sturdy construction.

SUMMARY OF THE INVENTION

Conventional standard wheelchairs include a framework supported upon two large wheels having hand rings and two front swivel casters. The seat is mounted between the large wheels, and usually includes footrests for supporting the patient's legs and feet. Often, the seat is formed of a flexible foldable material, and the frame is capable of folding to permit the wheelchair sides to be drawn toward each other to reduce the width of the chair and facilitate handling, transportation and storage. The frame usually includes horizontal upper and lower rails which support the seat and casters, respectively. In conventional wheelchairs, the location of the primary wheels relative to the frame is often adjustable for weight distribution purposes, and it is not uncommon for the seat back to have limited reclining capabilities. However, the seats of conventional wheelchairs are not tiltable with respect to the wheelchair frame.

The kit of the invention includes a pair of elongated shafts connected to a clamp at each end for mounting to the standard wheelchair upper frame rail. The upper shaft constitutes a seat support, while the lower shaft, which is parallel to the upper shaft, supports the seat adjuster, and is also associated with a brace which extends to a lower shaft having ends attached to the lower frame rail.

The seat support shaft is rotatably supported on its clamp and includes a sleeve and the seat frame is welded or bolted thereto whereby the seat frame is pivotally supported with respect to the wheelchair rails and frame. An infinitely variable seat adjuster, preferably constituting a gas/oil piston and cylinder arrangement biased by an internal spring is interposed between the seat adjuster shaft and an anchor defined on the seat frame spaced from the seat frame pivot axis. A manually operated control mounted upon the back of the seat back selectively adjusts the length of the seat adjuster thereby permitting the seat to be selectively locked in any desired angular position within its operating limits.

The seat frame includes a pair of upstanding studs located "behind" the seat support shaft, and pivot pins mounted upon the studs pivotally support the seat back. The seat back includes a handle bar to be gripped by an attendant aiding in the maneuvering of the wheelchair, and the angular position of the seat back is determined by a gas/oil piston and cylinder adjuster similar to that used with the seat which is interposed between the seat frame and the seat back at spaced locations. A manual control mounted upon the rear of the seat back separately controls the seat back adjuster to permit infinite variation of the angle of seat reclining within the operating limits of the seat back movement.

A brace shaft clamped to the wheelchair lower rails serves as an anchor for a rigid brace also attached to the seat adjuster shaft and the brace adds rigidity to the assembly and prevents shifting of the seat support shaft.

If desired, armrests may be mounted upon the seat back, and leg and footrests may be mounted upon the seat frame.

When installing the kit of the invention upon a standard wheelchair, the conventional seat and seat back structure are removed. However, the basic framework for the wheelchair which includes the adjustable mounting of the primary wheels to the frame are utilized, and the clamps affixed at the ends of the seat support and seat adjuster support shafts, and at the ends of the brace shaft, are shaped to readily accommodate the standard rails included in the wheelchair frame.

When assembled upon a standard wheelchair frame, the kit of the invention is firmly mounted upon the frame resulting in a sturdy and serviceable portable patient support. The angle of the seat may be readily adjusted to the horizontal to change the distribution of the patient's weight upon the seat and minimize sores and tenderness, and likewise, by varying the angle of seat back to the seat regardless of the seat angle the most comfortable orientation for the patient can be readily achieved. If desired, the kit may be removed from the associated wheelchair frame and the wheelchair restored to its prior non-adjustable condition since no permanent modification to the wheelchair structure has occurred during the installation of the kit of the invention.

BRIEF DESCRIPTION OF THE DRAWING

The aforementioned objects and advantages of the invention will be appreciated from the following description and accompanying drawings wherein.

DESCRIPTION OF THE PREFERRED EMBODIMENT

Figure 1:
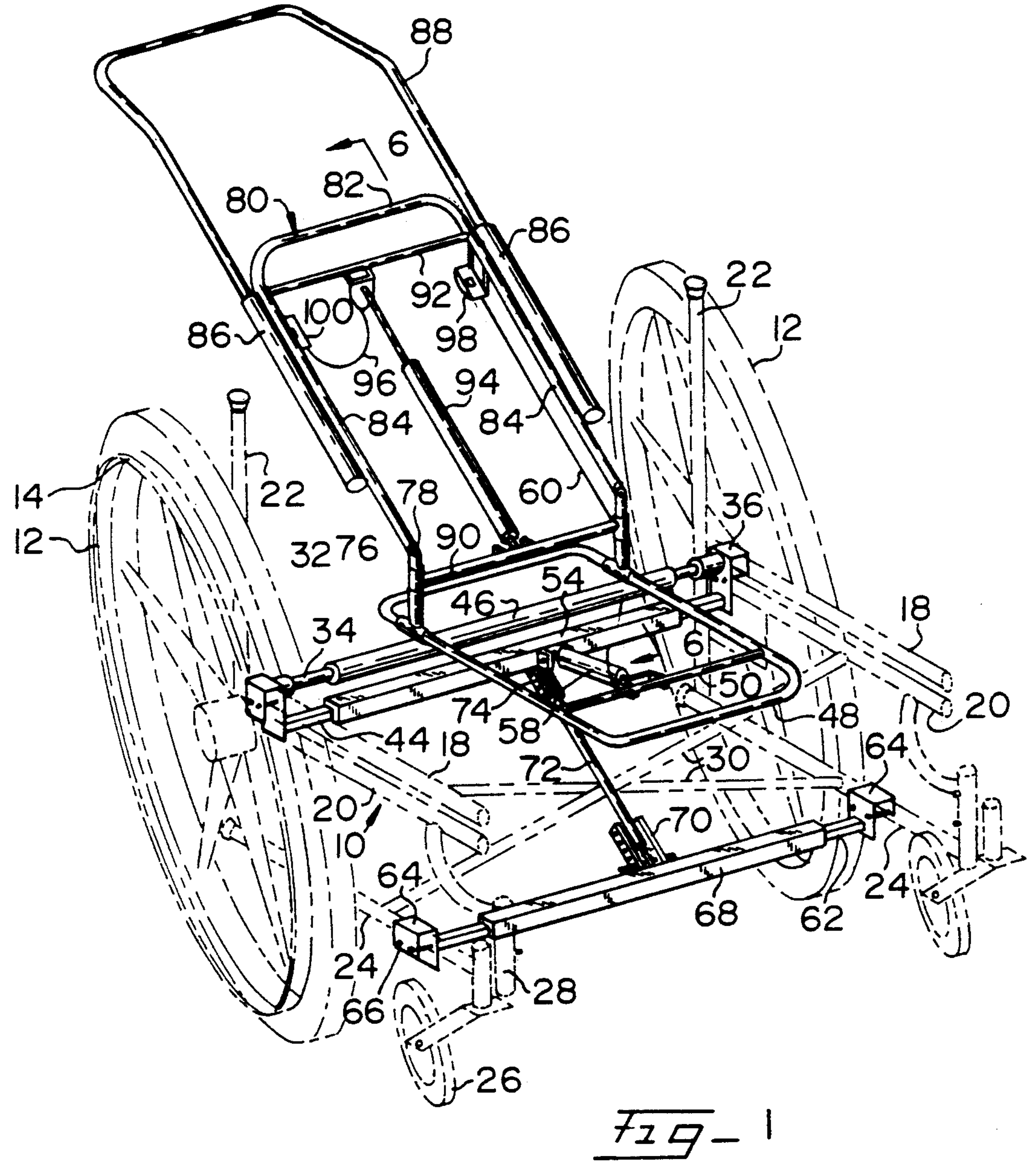
FIG. 1 is a front perspective view of a standard wheelchair, as shown in phantom lines, having a conversion kit in accord with the invention mounted thereon, the seat being shown in a non-tilted position, and the seat back being reclined.
Figure 2:
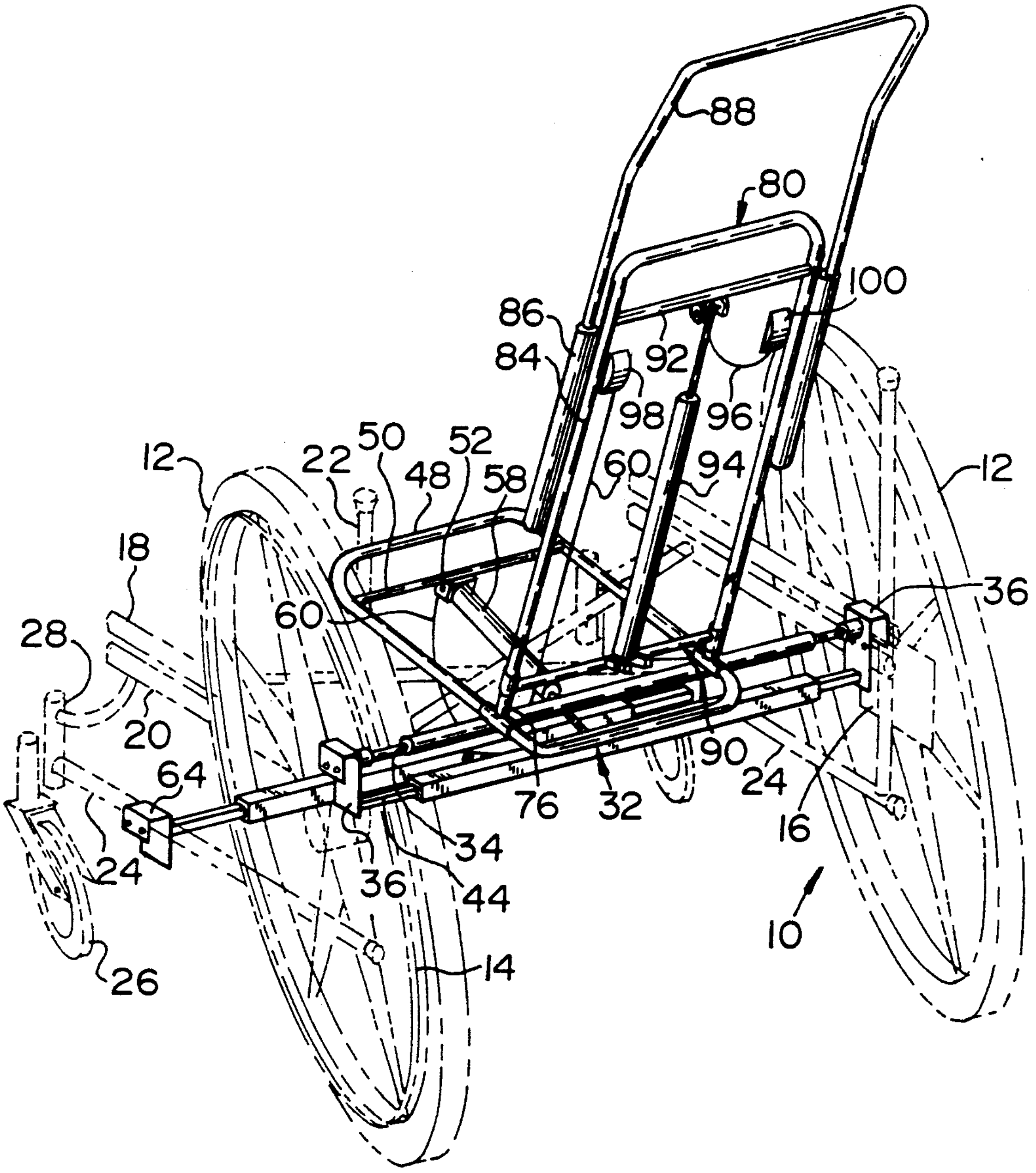
FIG. 2 is a rear perspective view of a standard wheelchair as shown in phantom lines illustrating the kit of the invention as mounted upon the wheelchair frame, the seat back being shown in an upright condition.

A standard wheelchair frame is shown in phantom lines in FIGS. 1 and 2, and the conversion kit of the invention is mounted upon such a standard wheelchair frame. It will be appreciated that prior to the installation of the conversion kit, the conventional seat and seat back structure along with the attendant armrest and footrest accessories have been removed.

The standard wheelchair frame is represented at 10 and includes a pair of large drive wheels 12 having the conventional hand rings 14 attached thereto for manually rotating the wheels. An adjustable wheel mounting plate 16 adjustably attaches the drive wheels 12 to the frame 10, and this adjustment is in both a vertical and horizontal direction whereby the center of gravity of the patient relative to the drive wheel axis can be pre-set in accordance with the patient's weight distribution characteristics. A pair of upper rails 18 and 20 are mounted upon each mounting plate and extend forward in a substantially horizontal direction therefrom. It will be appreciated that many wheelchair braces only use a single upper rail. Likewise, a vertical column 22 extends from each mounting plate. A lower rail 24 extends forwardly from the lower region of each mounting plate 16, and the wheelchair front casters 26 are mounted upon brackets 28 which are attached to the upper rail 20 and the lower rail 24. Usually, the frame 10 includes cross braces 30 which extend across the width of the frame between the upper rail 20 and the lower rail 24 as will be apparent from FIG. 1.

A standard wheelchair frame, prior to the installation of the conversion kit of the invention, will include the aforementioned components, or the equivalents thereof, and the standard seat and seat back, leg and footrests, and armrests, previously associated with the wheelchair frame have been removed, and are not illustrated.

Figure 3:
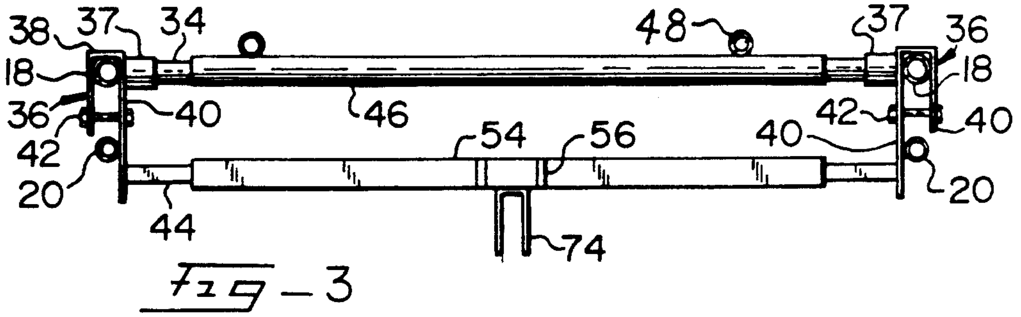
FIG. 3 is an elevational detail sectional view taken through the wheelchair rails illustrating the seat support and seat adjuster shafts and clamps.

The kit or assembly 32 which converts the wheelchair frame to a tiltable seat and reclinable seat back construction includes a seat support shaft 34 having ends, and each of the shaft ends is connected to an inverted U-shaped clamp 36 which is placed over the wheelchair frame upper rail 18 in a rotatable manner as the shaft ends are rotatably received within the clamp sockets 37, FIG. 3. The clamps 36 at each end of the shaft 34 are identical and include a base 38 which rests upon the upper rail 18 and parallel legs 40, one of which is of sufficient length to extend below the lower rail 20. Bolts 42 extending between the legs 40 firmly attach the clamps 36 to the rails 18.

A square seat adjuster shaft 44 has ends which are also affixed to the inner leg 40 of the clamps 36, and as will be appreciated from FIG. 3, the shafts 34 and 44 are in substantially parallel relation to each other.

A cylindrical sleeve 46 is fixed upon the seat support shaft 34 and the seat frame 48 engages the top of the sleeve 46 and is attached thereto by welding or bolts. In this manner, the seat frame 48 is pivotally mounted upon the clamps 36 permitting the seat frame to tilt with respect to the wheelchair frame 10.

The seat frame 48 is formed by tubular conduit, and is of a generally rectangular configuration having rounded corners. The seat frame includes a crossbar 50 adjacent the front end of the seat frame, and the crossbar includes a seat adjuster anchor 52.

A square sleeve 54 is mounted upon the seat adjuster shaft 44 and includes a centrally located anchor 56 whereby the longitudinally adjustable and lockable seat adjuster 58 is attached to the anchors 52 and 56 and determines the tilting angle of the seat frame 48. The seat adjuster 58 is preferably a gas/oil device utilizing a cylinder having a longitudinally positionable piston therein. The piston is provided with controllable bypass valving operated by a valve operating mechanism as controlled by the Boden wire cable 60. The seat adjuster 58 is a commercially available item, and in an embodiment of the invention Part No. 864609 as manufactured by Stabilus of Colmar, Pa., is used.

Figure 4:
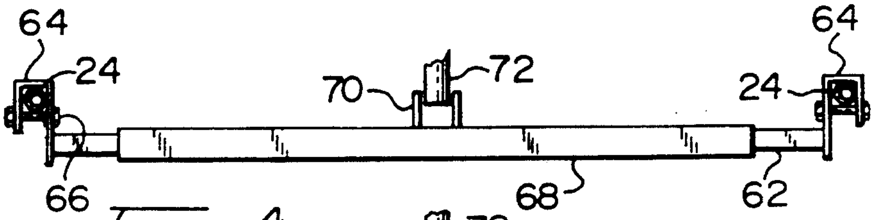
FIG. 4 is a front elevational sectional view of the brace shaft as mounted upon the wheelchair lower rails.
Figure 5:
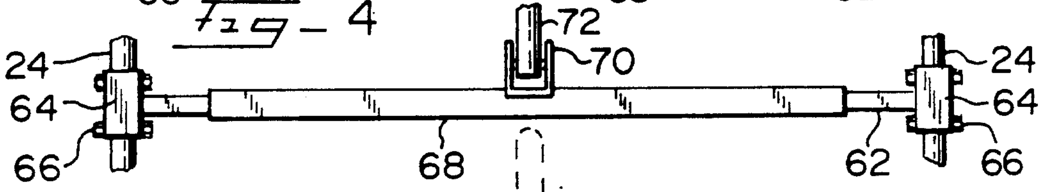
FIG. 5 is a top plan view of FIG. 4.
Figure 6:
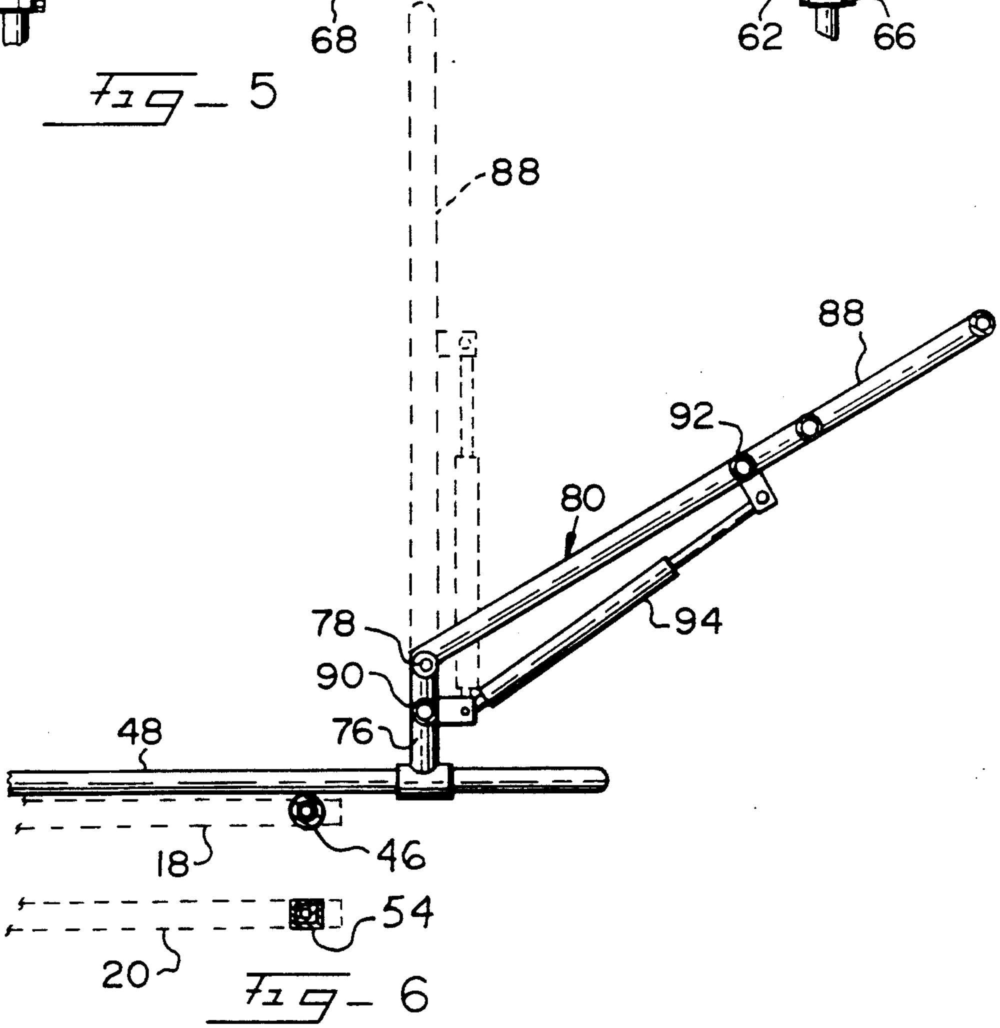
FIG. 6 is a detail side elevational view, partially sectioned, of the rear of the seat frame illustrating the seat back in a reclined position in full lines, and indicating the seat upright position in dotted lines.

A square brace supporting shaft 62 includes ends which are mounted upon the inverted U-shaped clamps 64, and the clamps 64 are mounted upon the wheelchair lower rail 24, FIGS. 4 and 5. Bolts 66 extending through the legs of the clamps 64 firmly attach the clamps and the brace shaft 62 with respect to the lower rail 24. A square sleeve 68 is mounted upon the shaft 62 and includes an adjustable U-shaped bracket 70 having legs in which a plurality of holes are formed therein for defining an adjustable anchor for the rigid brace 72. A brace anchor 74 is attached to the seat adjuster shaft sleeve 54 adjacent the anchor 56, and adjustably receives the upper end of the brace 72. In this manner, the brace 72 rigidly positions the shafts 34 and 44 and their associated clamps 36, and the brace 72 imparts a high strength and rigidity to the kit assembly 32 to accommodate the forces imposed upon the kit during tilting of the seat frame 48 and the change of the weight distribution on the kit 32 and the wheelchair frame 10 and prevents shifting or rotation of the clamps 36 on the rails 18.

A pair of upstanding studs 76 are defined upon the seat frame behind the connection of the seat frame to the sleeve 46, and a pivot pin or rivet 78 is defined at the upper end of each of the studs 76. The seat back frame 80 is in the form of a U-shaped member having a base 82 and parallel legs 84. The lower end of the legs 84 are attached to the pivot pins 78, and in this manner, the seat back frame 80 is pivotally mounted upon the seat frame 48. Handle socket sleeves 86 are affixed to the legs 84 for receiving the extendible handle 88 which is grasped by the wheelchair attendant for ease of maneuverability.

A seat adjuster bar 90 extends between the studs 76, and the seat back frame 80 includes a bar 92 extending between the legs 84 at a location remote from the pivot pins 78. The bars 90 and 92 are centrally provided with anchors for receiving the opposite ends of the seat back adjuster 94. The adjuster 94 is a cylinder and piston longitudinally adjustable and lockable unit identical to the seat adjuster 58, and includes a Boden wire control cable 96.

The controls for the seat adjuster 58 and the seat back adjuster are located on the back of the seat back frame 80. These controls are in the form of lever type handles mounted in suitable housings and associated with the ends of the control cables for operating the control cables to control the associated adjuster. The control lever housing 98 is associated with the cable 60 so as to control the operation of the seat adjuster 58, and the control lever housing 100 is associated with the end of the cable 96 for controlling the seat back adjuster 94. The seat adjuster 58 includes an internal compression spring biasing the adjuster to an extended position tending to tilt the seat frame 48 upwardly. The weight of the occupant overcomes the spring in adjuster 58, and the spring aids the chair occupant in raising the seat frame. The seat back adjuster 94 includes an internal compression spring biasing the adjuster toward its extended position tending to bias the seat back frame 80 in an upright non-reclining position, and this biasing action will bring the seat back frame to its upright position once the occupant's weight is removed from the seat back.

An upholstered seat, not shown, is mounted upon the seat frame 48, and this seat may take any conventional configuration or form. The amount of upholstery or padding desired is optional and determined by the installer. In a like manner, the seat back frame 80 is upholstered as desired and associated with such structure as to meet the comfort needs of the patient and provide an attractive appearance. The control cable housings 98 and 100 are so mounted upon the seat back frame 80 as to be accessible through the upholstery located on the seat back frame, and the control housings are readily accessible to a person standing behind the wheelchair grasping the handle 88. In this manner, an attendant standing behind the wheelchair may help the occupant achieve the desired seat tilting or angle of seat back reclining. Of course, the upholstered seat and seat back structure must be so designed as to not interfere with the movement of the seat frame and seat back.

If desired, adjustable armrests may be mounted upon the seat back frame 80, and as is the usual practice, leg and footrests would be mounted upon the seat frame 48 to accommodate the occupant's legs and feet and provide support thereof. Such added "accessories" to the seat frame and seat back frame are conventional and form no part of the instant invention, and are not shown.

As the components of the assembly kit 32 are readily manufacturable and assembled, and as the clamps 36 and 64 permit the assembly kit 32 to be easily and rigidly affixed to a conventional wheelchair frame, the kit 32 may be mounted upon the wheelchair frame 10 by a person of ordinary skill with conventional tools, and by the use of the conversion assembly kit 32 a previously non-adjustable wheelchair can be quickly converted to a wheelchair having a tiltable seat and reclinable seat back which greatly adds to the comfort and needs of the patient.

It is appreciated that various modifications to the inventive concepts may be apparent to those skilled in the art without departing from the spirit and scope of the invention.

I claim:

1. Apparatus for converting a standard non-tilting seat wheelchair to a tilting seat wheelchair wherein the wheelchair includes spaced upper and lower support rails, the improvement comprising, an elongated seat support extending between the upper support rails having ends, upper wheelchair rail mounting clamps defined on said seat support ends, a first elongated seat adjuster support having ends, means for attaching said seat adjuster support ends upon the upper wheelchair rails below said seat support, a seat frame mounted upon said seat support pivotal about a pivot axis, a seat adjuster anchor defined on said seat frame spaced from said pivot axis, an elongated longitudinally extendible lockable seat adjuster affixed to and extending between said first seat adjuster support and said seat adjuster anchor, and a manually operated control controlling locking of said seat adjuster.

2. In an apparatus for converting a wheelchair as in claim 1, seat back pivot means supported on said seat support having a pivot axis parallel to said seat frame pivot axis, a seat back mounted upon said seat back pivot means for selective reclinable adjustment, a first seat back adjuster anchor supported by said seat support and spaced from said seat back pivot means axis, a second seat back adjuster anchor defined on said seat back, an elongated longitudinally extendable lockable seat back adjuster affixed to and extending between said first and second seat back anchors, and a manually operated control controlling locking of said seat back adjuster.

3. In an apparatus for converting a wheelchair as in claim 1, seat back pivot means defined on said seat frame having an axis spaced from and substantially parallel to said seat frame pivot axis, a seat back mounted upon said seat back pivot means for selective reclinable adjustment, a first seat back adjuster anchor defined on said seat frame, a second seat back adjuster anchor defined on said seat back, an elongated longitudinally extendible lockable seat back adjuster affixed to and extending between said first and second seat back anchors, and a manually operated control controlling locking of said seat back adjuster.

4. In an apparatus for converting a wheelchair as in claim 1, said seat support comprising a shaft, a sleeve concentrically mounted upon said shaft, said seat frame being fixed to said sleeve, the axes of said sleeve and shaft defining said seat frame pivot axis.

5. In an apparatus for converting a wheelchair as in claim 4, sockets defined upon said upper wheelchair rail mounting clamps, the ends of said seat support shaft being rotatably mounted within said sockets.

6. In an apparatus for converting a wheelchair as in claim 1, said lockable seat adjuster comprising an extendible piston reciprocable within a cylinder, fluid within said cylinder, said manually operated control controlling movement of said piston within said cylinder.

7. In an apparatus for converting a wheelchair as in claim 3, said pivot means defined upon said seat frame comprising a pair of spaced upstanding studs defined on said seat frame each having an upper end, a pivot pin supported in each stud upper end, said pivot pins' axes being coaxial and parallel to said seat frame pivot axis, said seat back including spaced members having lower ends connected to said pivot pins.

8. In an apparatus for converting a wheelchair as in claim 7, said lockable seat back adjuster comprising an extendible piston reciprocable within a cylinder, fluid within said cylinder, said manually operated control controlling movement of said piston within said cylinder.

9. In an apparatus for converting a wheelchair as in claim 1, said seat support and seat adjuster support comprising substantially parallel shafts each having first and second ends, said first and second ends, respectively, being connected to common rail clamps, said rail clamps being connectable to the wheelchair upper rails, an elongated brace shaft having ends, clamps defined on said brace shaft ends connectable to the wheelchair lower rails, and a brace extending between said seat adjuster support shaft and said brace shaft.

10. In an apparatus for converting a wheelchair as in claim 9, an adjustable brace anchor mounted on said brace shaft permitting adjustment of the mounting of said brace shaft with respect to said seat adjuster support shaft.

11. In an apparatus for converting a wheelchair as in claim 3, said manually operated control controlling locking of said seat adjuster comprising a flexible cable having one end affixed to said seat adjuster and a second end attached to a control lever mounted upon said seat back, and said manually operated control controlling locking of said seat back adjuster comprising a cable having an end connected to said seat back adjuster and an opposite end connected to a control lever pivotally mounted upon said seat back.

* * * * *